(12) United States Patent
Koch et al.

(10) Patent No.: US 8,202,005 B2
(45) Date of Patent: Jun. 19, 2012

(54) BEARING MODULE FOR A VACUUM PUMP

(75) Inventors: Bernhard Koch, Merenberg (DE); Joerg Stanzel, Wetzlar (DE)

(73) Assignee: Pfeiffer Vacuum GmbH, Asslar (DE)

( * ) Notice: Subject to any disclaimer, the term of this patent is extended or adjusted under 35 U.S.C. 154(b) by 913 days.

(21) Appl. No.: 11/983,461

(22) Filed: Nov. 9, 2007

(65) Prior Publication Data

US 2008/0112660 A1   May 15, 2008

(30) Foreign Application Priority Data

Nov. 11, 2006 (DE) .................. 10 2006 053 237

(51) Int. Cl.
*F16C 19/00* (2006.01)
*F16C 33/66* (2006.01)

(52) U.S. Cl. ........................ 384/465; 384/469

(58) Field of Classification Search ............ 384/462, 384/464, 465, 469, 473; 415/111, 112
See application file for complete search history.

(56) References Cited

U.S. PATENT DOCUMENTS

| 4,181,379 A * | 1/1980 | Letts ................... 384/465 |
| 4,286,829 A * | 9/1981 | Heemskerk ............ 384/469 |
| 4,365,851 A * | 12/1982 | Andres et al. .......... 384/465 |
| 4,541,784 A | 9/1985 | Hoerle |
| 2003/0003004 A1 | 1/2003 | Stones et al. |

FOREIGN PATENT DOCUMENTS

WO   2006131694   12/2006

OTHER PUBLICATIONS

European Search Report, Mar. 2008.

\* cited by examiner

*Primary Examiner* — Richard W Ridley
*Assistant Examiner* — Phillip A Johnson
(74) *Attorney, Agent, or Firm* — Abelman, Frayne & Schwab

(57) ABSTRACT

A bearing module for supporting a rapidly rotatable shaft of a vacuum pump includes a rolling bearing for supporting rotatably the shaft, a reservoir for a lubricant having an element forming a sliding contact with a delivery structure supported on the shaft for delivery of the lubricant in the rolling bearing under action of centrifugal forces generated during rotation of the shaft, and a radial delivery element provided on a side of the rolling bearing opposite a side of the bearing at which the delivery structure is located, for returning the lubricant to the reservoir.

9 Claims, 3 Drawing Sheets

BEARING MODULE FOR A VACUUM PUMP

BACKGROUND OF THE INVENTION

1. Field of the Invention

The present invention relates to a bearing module for a vacuum pump having a rapidly rotatable shaft, with the bearing module including a rolling bearing for supporting rotatably the shaft, and a reservoir for a lubricant having an element forming a sliding contact with a delivery structure supported on the shaft for delivery of the lubricant in the rolling bearing under action of centrifugal forces generated during rotation of the shaft.

2. Description of the Prior Art

Despite advances in the vacuum technology, it is very important, in particular for rapidly rotatable shafts, to insure delivery of lubricant to rolling bearings which rotatably support the shafts. The lubricant generally undergoes changes and becomes contaminated with impurities. Despite lubrication, the rolling bearings are still subjected to wear because of friction. Therefore, both the lubricant and the rolling bearings should be replaced from time to time.

According to the state of the art, conventionally, there is provided a reservoir for lubricant in which the lubricant is stored as in a sponge. The rolling bearing is placed on a shaft and is secured to a housing part, together with a ring of a flexible material, with a threaded ring. At a side of the shaft remote from the rolling bearing, the reservoir, which surrounds the shaft end, is arranged. Under the action of centrifugal forces, the lubricant is delivered in the bearing and drips therefrom under the gravity force back into reservoir.

For proper functioning, the degree of preload of the material of the above-mentioned flexible ring is very important. One of the problems of the solution according to the state of the art consists in that the preload should be precisely adjusted after replacement of the bearing in the pump in which the shaft support arrangement is used. This makes servicing of the pumps more difficult. Moreover, the gravity force may be insufficient for returning the lubricant into the reservoir, as the gravity field of the earth depends on the orientation of the pump in space. To insure a reliable circulation of the lubricant, expensive constructions are used in the state of the art. E.g., German Publication DE-A-103 21 326 discloses an expensive lubricant feeding device with lubricant pumps. The device reliably operates only with delivery of a large amount of lubricant.

Accordingly, an object of the present invention is to provide an arrangement for delivery lubricant to a bearing and which is constructively simple and can be used in different installation positions.

SUMMARY OF THE INVENTION

This and other objects of the present invention, which will become apparent hereinafter, are achieved by providing, in the bearing module of the type discussed above, radial delivery means on a side of the rolling bearing opposite a side of the bearing at which the delivery structure or element is located, for returning the lubricant to the reservoir. The delivery means operates under the action of capillary forces. The radial delivery means permits to obtain a lubricant circulation loop that is advantageously independent of the gravity forces. This permits to use the pump in different positions, without the lubrication of the bearing being adversely affected. Thereby, there is provided a simple construction with which advantages of a multi-layered capability are achieved.

Because of the use of the capillary forces, the invention insures a satisfactory circulation of the lubricant at small amounts of the lubricant.

An advantageous and compact structure is obtained when the radial delivery means is arranged in a bearing module, so that upon manufacturing of the bearing module, the radial delivery means is already available.

Advantageously, the bearing module further includes axial delivery means forming part of a lubricant delivery loop and located between the radially delivery means and the reservoir. The axial delivery means insures more freedom when designing the lubrication circulation loop and permits to arrange the radial delivery means and the reservoir at a distance from each other.

According to an advantageous embodiment of the present invention, the bearing module has first and second parts, and the radial delivery means is formed as a slot provided between the first and second parts. The first and second parts are screwed with each other, with the one of the parts being provided with an outer thread and another of the parts being provided with an inner thread. The threaded connection insures not only the connection of the two parts but also their mutual positioning. The width of the slot depends on the degree the two parts are screwed with each other. The relative positioning of the two parts also determines the position of the bearing which, thus, can be easily and precisely adjusted by varying the degree with which the two parts are screwed with each other.

According to a modified embodiment, the slot is connected with a bore formed in the outer ring of the bearing so that the lubricant can flow into the slot directly form the bearing. This simplifies the design of the lubricant circulation loop and insures a reliable transfer of the lubricant from the bearing.

According to another embodiment of the present invention, the first and second parts are provided with a coating at least on portions of their surfaces, which are in contact with the lubricant, to prevent a chemical change of their material because of reaction with the lubricant. This increases the service life of the two parts and prevents their damage. Because the coated parts are small in comparison with other housing components, the costs are insignificant.

The first and second parts form parts of a slide-in unit. Therefore, only the position of the entire slide-in unit in the pump housing needs to be fixed. The slide-in unit is pushed into the vacuum pump housing and is releasably secured there. This makes possible to determine the position of the rolling bearing by the design of the entire assembly of the bearing module, which is secured in the pump housing. The adjustment takes place not in the vacuum pump but rather during the manufacturing of the slide-in unit, which facilitate servicing of the pump.

According to an advantageous embodiment of the vacuum pump itself, in particular, of a turbomolecular pump, the rolling bearing on the fore-vacuum side of the shaft is combined with a permanent magnetic bearing on the high-vacuum side. The permanent magnetic bearing generates forces directed along the shaft axis. These forces require a particularly precise adjustment of the position of the rolling bearing which is achieved with a bearing module according to the present invention.

In addition, for the vacuum pumps, it is important that they can be operated in any installation position. Rapid rotation of the shaft requires, in particular in turbomolecular pumps, a very reliable lubricant circulation loop, which is achieved with a bearing module according to the present invention.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
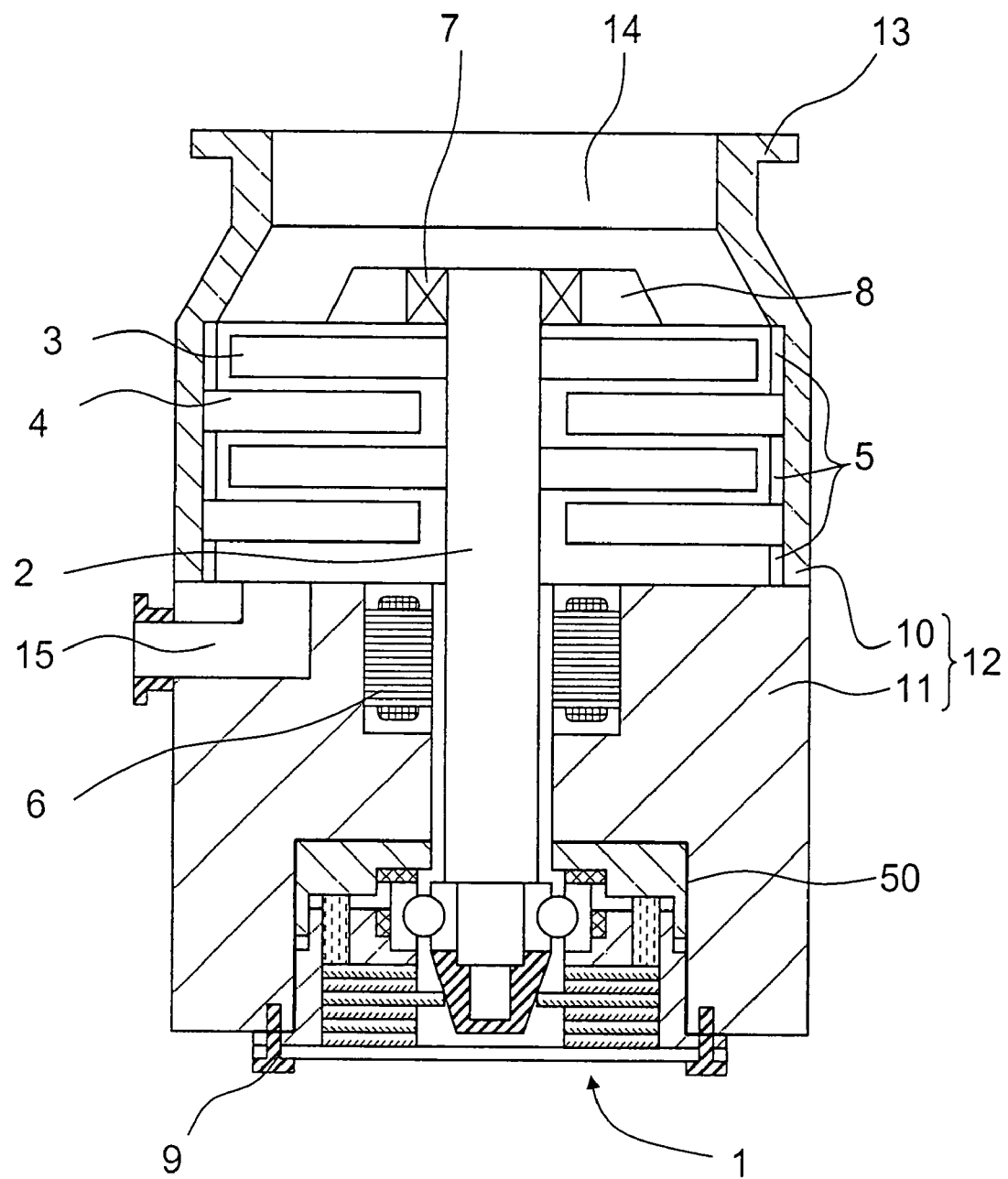
FIG. 1 a cross-sectional view of a vacuum pump with a bearing module according to the present invention.

FIG. 1 shows a turbomolecular pump further turbo pump, which is equipped with a bearing module according to the present invention. The turbo pump has a housing including an upper part 10 in which the pumping system is located and a lower part that houses, among others, the drive 6. The drive 6 sets the shaft 2 in a rapid rotation with a rotational speed that exceeds, in gas friction pumps and, in particular, turbo pumps, 10,000 revolutions per min. On the shaft 6, vane-carrying rotor discs 3 are secured. The rotor discs 3 are mounted on the shaft at a distance from each other. In the gaps between the rotor discs 3, stator discs 4, which are likewise provided with vanes, are arranged. Spacer rings 5 hold the stator discs 4 axially spaced from each other. The stator discs 4 are centered by upper part 10 of the housing. The housing further has a flange 13 that surrounds a gas inlet 14 and that can be releasably connected with a recipient. Gas, which enters the inlet 14, is forwarded by the rotor discs 3 and the stator discs 4, and is discharged through the gas outlet 15. In the upper housing part 10, there is provided a bearing holder 8 in which a bearing 7 that rotatably supports the shaft 2, is located. The bearing 7 is provided at the shaft end and is formed, advantageously, as permanent magnet bearing. It is conceivable to arrange this bearing in the drive region and so form a floating bearing. It is also conceivable to provide a bell-shaped rotor and to arrange the bearing 7 beneath the bell-shaped rotor. At the end of the shaft 2 opposite the bearing 7 a further bearing is provided. The further bearing is located in a bearing module 1 according to the present invention. The bearing module 1 is pushed into a cylindrical cavity 50 provided in the lower part 11 and is releasably secured therein with screws 9. Other securing means can also be used.

Figure 2:
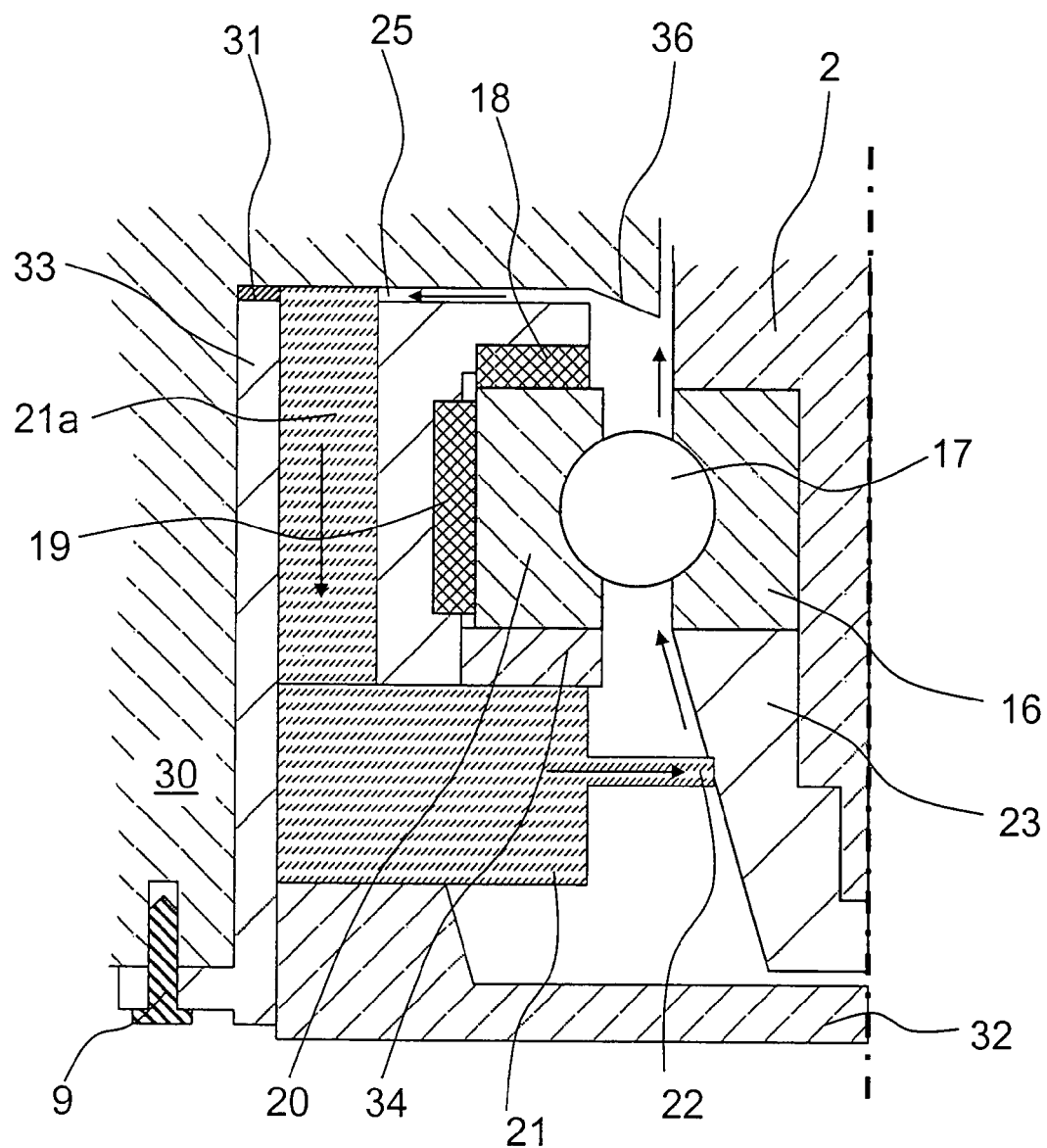
FIG. 2 a cross-sectional view of a first embodiment of the support model according to the present invention.

A first embodiment of the bearing module according to the present invention is shown in FIG. 2. The bearing module 33 is arranged in a pump housing 30. The bearing module 33 is pushed into a hollow cavity, which is formed in the pump housing 30 and is releasably secured therein, e.g., with screws 9 or any other securing means. The bearing module 33 contains a reservoir for lubricant. The reservoir 21 is formed of an absorbent material or a material stimulated by capillary forces, e.g., felt. An element 22 slides along a structure supported on the shaft 2 and subjected to action of centrifugal forces. The above-mentioned structure provides for delivery of lubricant to the rapidly rotatable shaft 2. The structure, which is supported on the shaft 2 and is subjected to action of centrifugal forces, is formed as a lubrication nut 23. Such a nut is screwed on a shaft end and has a conical outer surface.

The diameter of the cone widens in the direction of the rolling bearing. The rolling bearing is formed of outer ring 20, inner ring 16 and roller body 17. The inner ring 16 is mounted on the shaft 2 and is secured with the lubrication nut 23. The lubrication nut 23 insures flow of the lubricant into the rolling bearing. The surplus lubricant flows out of the rolling bearing along the direction shown with arrow and is deflected by a conical surface 36 provided on the housing 30. The lubricant flows to the lubricant reservoir 21 through a slot 25 the width of which is so selected that the delivery is caused by capillary forces. The lubricant is delivered to a part 21a of the lubricant reservoir. A precise adjustment of the width of the slot 25 is insured by a spacer ring 31. The part 21a of the reservoir 21 projects beyond the end surface of the bearing module 33 and into the slot 25 only in several locations. The slot 25 can be additionally filled with felt or similar material so that the delivery takes place in the radial direction by the action of capillary forces in the material. Therefore, the width of the slot 25 should not be very small, which simplifies the manufacturing and assembly. Instead of a slot, a bore can be provided between the region of the conical surface 36 and the part 21a of the reservoir 21. The cover 32 holds the reservoir 21 in place, with the entire arrangement being closed vacuum-tightly. The part 21a of the reservoir 21 and the reservoir 21 can be formed as a one-piece element or be formed of several parts. The formation of several parts simplifies the assembly. The outer ring 20 of the rolling bearing is supported with a possibility of oscillating movement by an axial oscillating ring 18 and a radial oscillating ring 19. The outer ring 20 is secured in the bearing module 33 with a threaded ring 34.

Figure 3:
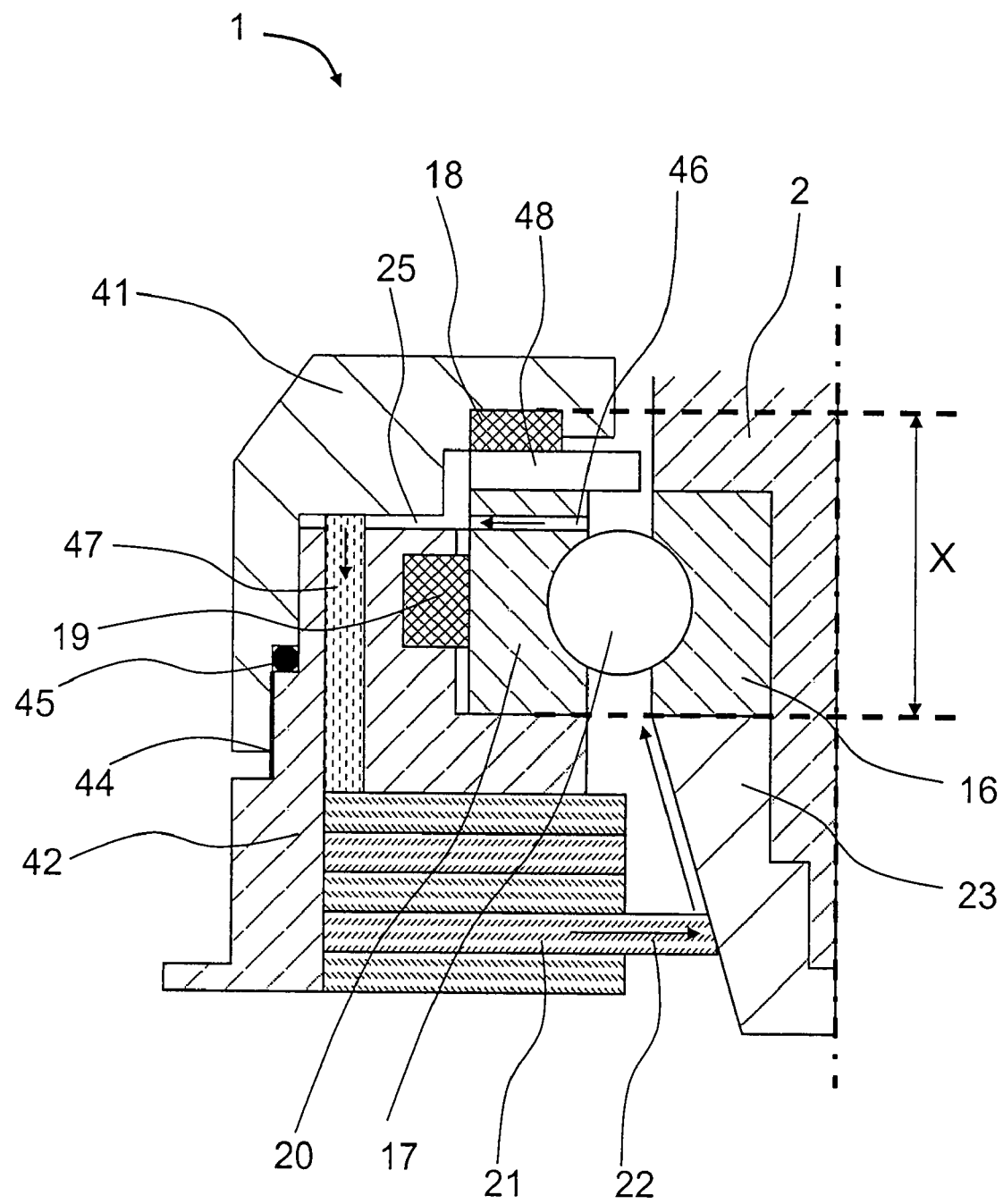
FIG. 3 a cross-sectional view of a second embodiment of the support model according to the present invention.

FIG. 3 shows a second embodiment of the bearing module according to the present invention. In this embodiment, the bearing module 1 is formed of a first part 41 and a second part 42 screwed with each other by screw means 44. A slot 25 is formed between the two parts. A seal 45 is provided between the two parts 41, 42. The seal 45 is designed to seal the slot 25, on one hand and, on the other hand, to provide a preload that opposes unscrewing of the two parts 41, 42, e.g., caused by vibrations. Other safety means can also be used.

The parts 41, 42 retain the outer ring 20 of the rolling bearing with radial 19 and axial 18 oscillating rings. A disc 48, which serves as a lubricant stop, is arranged between the axial oscillating ring 18 and the outer ring 20. The parts 41 and 42 surround the end region of the shaft 2 which is provided with a thread for screwing the lubrication nut 23 thereon. The inner ring 16 of the rolling bearing is clamped between the shaft 2 and the lubrication nut 23. The roller body 17 is located in the interior of the rolling bearing. In the interior of the part 42, a reservoir 21 for the lubricant is located. The reservoir 21 has an element 22 that is in a sliding contact with the lubrication nut 23. The reservoir 21 is formed of several layers of an absorbent material or a material susceptible to influence of capillary forces. From the reservoir 21, the lubricant reaches the conical surface of the lubrication nut 23 via the element 22, and is delivered inside of the rolling bearing as a result of action of centrifugal forces which are generated upon a rapid rotation of the shaft. In the outer ring 20, a bore 46 is provided which communicates with the slot 25. Thereby, the surplus lubricant is delivered from the rolling bearing to the slot 25. The slot is formed so that a capillary force can be produced. Alternatively, the slot 25 can be filled with a material that would insure the delivery of the lubricant radially outwardly.

From the slot 25, the lubricant is delivered through axial delivery means 47 and under action of the capillary forces back into the reservoir 21. According to a further modification, a plurality of axial delivery means 47 can be provided about the central axis, so that it would be possible to orient the bearing module 33 and, thereby, the vacuum pump in any spacial direction. The delivery means 47 itself contains a porous sintered plastic material, felt-like material, or any other material capable to receive the lubricant within its interior and deliver it further. The axial delivery means 47 can be formed as a bar.

Alternatively, instead of the slot 25, a bore, which would act as radial delivery means, can be provided. Under the term "radial" delivery, the delivery from the central axis outwardly is understood. The radial delivery means can also be offset simultaneously in the axial direction, with the delivery means being inclined to the central axis.

Instead of the slot 46, the stop disc 48 can be provided with radial channels or a spiral channel extending from inward outwardly.

An advantage of the second embodiment consists in that by screwing the parts 41, 42 with each other, the dimension X can be adjusted. This dimension, together with permanent magnet bearings, is of great importance. During the operation of the vacuum pump, the shaft is displaced in a direction away from the reservoir 21. Thereby, the oscillating ring 18 becomes compressed. The position of the shaft 2 in space is determined, in particular, by the position of the part 41. The position of the part 41 relative to the part 42 and, therefore, relative to the pump housing of the vacuum pump and, finally, relative to the permanent magnetic bearing, can be precisely adjusted with thread means 44. The advantage of this consists in that this adjustment takes place during the manufacturing of the bearing module and not during assembly of the vacuum pump.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A vacuum pump, comprising a housing; a shaft rotatably supported in the housing; and a bearing module located in the housing for rotatably supporting the shaft at one end thereof and including a rolling bearing for rotatably supporting the shaft, a reservoir for a lubricant having an element forming a sliding contact with a delivery structure supported on the shaft for delivery of the lubricant in the rolling bearing under action of centrifugal forces generated during rotation of the shaft, and radial capillary delivery means provided on an end side of the rolling bearing opposite an end side of the rolling bearing at which the delivery structure is located, and formed as a slot for returning the lubricant to the reservoir, wherein the housing has a cylindrical receptacle for receiving the bearing module, and wherein the vacuum pump further comprises means for securing the bearing module in the housing receptacle.

2. A vacuum pump according to claim 1, further comprising a permanent magnetic bearing for supporting the shaft at an end thereof opposite the bearing module.

3. A vacuum pump according to claim 1, wherein the bearing module includes axial delivery means forming part of a lubricant delivery loop and located between the radial capillary delivery means and the reservoir.

4. A vacuum pump according to claim 1, wherein the bearing module has first and second parts, and the radial capillary delivery means forming a slot is provided between the first and second parts.

5. A vacuum pump according to claim 1, wherein the rolling bearing has an outer ring connected with the slot, whereby the lubricant can be delivered from interior of the bearing outwardly.

6. A vacuum pump according to claim 1, wherein at least one of the first and second parts of the bearing module is adapted for receiving the reservoir.

7. A vacuum pump according to claim 1, wherein the first and second parts of the bearing module are provided with a coating at least on portions of their surfaces which are in contact with the lubricant, to prevent a chemical change of their material because of reaction with the lubricant.

8. A vacuum pump according to claim 1, wherein the housing has an upper part in which a pumping system is located, and a lower part in which a pump drive is located, the lower part having at an end thereof remote from the upper part, a cylindrical cavity that form the cylindrical receptacle for receiving the bearing module.

9. A vacuum pump according to claim 1, wherein the sliding contact-forming element is formed as a radial capillary element.

\* \* \* \* \*